United States Patent [19]

Giannetti et al.

[11] Patent Number: 4,864,006

[45] Date of Patent: * Sep. 5, 1989

[54] PROCESS FOR THE POLYMERIZATION IN AQUEOUS DISPERSION OF FLUORINATED MONOMERS

[75] Inventors: Enzo Giannetti, Novara; Mario Visca, Alessandria, both of Italy

[73] Assignee: Ausimont S.p.A., Milan, Italy

[*] Notice: The portion of the term of this patent subsequent to Dec. 6, 2005 has been disclaimed.

[21] Appl. No.: 41,525

[22] Filed: Apr. 23, 1987

[30] Foreign Application Priority Data

Jun. 26, 1986 [IT] Italy ............................... 20909 A/86

[51] Int. Cl.$^4$ ............................................... C08F 2/00
[52] U.S. Cl. .................................. 526/209; 526/254; 526/206
[58] Field of Search ....................... 526/206, 254, 209

[56] References Cited

U.S. PATENT DOCUMENTS

| | | | |
|---|---|---|---|
| 2,559,752 | 7/1951 | Berry | 526/255 |
| 3,635,926 | 1/1972 | Gresham et al. | 526/247 |
| 3,864,322 | 2/1975 | Yallourakis | 526/247 |
| 4,369,266 | 1/1983 | Kuhls et al. | 528/502 |
| 4,523,039 | 6/1985 | Lagow et al. | 568/677 |

OTHER PUBLICATIONS

CA 100 (10): 71067w, Caporiccio et al–"Lubricating Greases"–1983.
CA 103 (6): 38672d, Nippon Mectron Co., "Polyperfluoroether Emulsion"–1985.
McCutcheon's Emulsifiers & Detergents–1982, p. 84.

*Primary Examiner*—Joseph L. Schofer
*Assistant Examiner*—N. Sarofim
*Attorney, Agent, or Firm*—Stevens, Davis, Miller & Mosher

[57] ABSTRACT

A process for polymerizing or copolymerizing fluorinated monomers, in an aqueous dispersion, by using radicalic-type starters and fluorinated surfactants, characterized in that it is operated in the presence of a perfluoropolyether having neutral end groups and prepared in the form of an aqueous microemulsion, in order to increase the polymerization rate, to increase the process reproducibility and to minimize the consumption of said perfluoropolyether.

8 Claims, No Drawings

PROCESS FOR THE POLYMERIZATION IN AQUEOUS DISPERSION OF FLUORINATED MONOMERS

The invention relates to a process for polymerizing and copolymerizing fluorinated monomers, in an aqueous dispersion, in the presence of radicalic starters, characterized in particular by a much higher polymerization rate than the one attainable in the known processes under analogous operative conditions.

As is well known, the fluoroolefins exhibit different reactivities in the polymerization process, some of them having very low o no reactivities in comparison with tetrafluoroethylene (TFE). In this connection, $C_3F_6$ may be cited as an example.

Also some perfluorinated vinylethers exhibit a very low reactivity in polymerization with respect to the other fluoroolefins, in particular with respect to TFE (see US P 3,132,123).

The consequence of this behaviour is that the preparation of copolymers from comonomers having very different reactivities from one onther requires to operate with a high concentration of the less reactive monomers and therefore to operate at a very high partial pressure of said comonomer.

For example, to prepare FEP (thermoplastic copolymer $C_2F_4$—$C_3F_6$) with a content of 5–25% by weight of $C_3F_6$, it is necessary to operate with a high concentration of $C_3F_6$ in the gas phase, corresponding to a total pressure of the monomers in the range of from 35 to 40 kg/cm² abs. (see US P 3,132,124).

Thus, the necessity was felt to increase the polymerization rate for the low-reactive monomers in order to avoid operating at very high pressures, and at the same time to reduce the polymerization times.

Object of Italian patent application No. 20,256 A/86 in the name of the same Applicant hereof is a process for polymerizing or copolymerizing fluorinated monomers in an aqueous dispersion by using radicalic starters and fluorinated surfactants, in the presence of a perfluoropolyether having neutral end groups, being liquid under the polymerization conditions and in the form of an aqueous emulsion. This process exhibits a very great number of advantages in comparison with the usual polymerization in the absence of perfluoropolyether, while it rises some problems as regards the reproduceability of the emulsion when it is operated with autoclaves of great volume. Furthermore, the process requires the use of considerable amounts of perfluoropolyether in order to obtain remarkable effects on the polymerization rate, what leads, as is well known, to a considerable increase in costs. Moreover, the emulsion must be prepared at the moment, and it cannot be stored due to the limited shelf life of the perfluoropolyethereal emulsions.

It has now surprisingly been found that it is possible to overcome these problems by preparing the perfluoropolyether in the form of an aqueous microemulsion.

The term "microemulsion" is used to designate a system in which the perfluoropolyether having neutral end groups is solubilized by a surfactants solution, to provide a monophase solution, which is stable in the long run, without providing dispersion energy.

In fact, the microemulsion is prepared by simple mixing of the components: water, perfluoropolyether having neutral end groups and a fluorinated surfactant, in particular of the type of perfluoropolyether having carboxylic end groups or cationic end groups. The detailed description of the microemulsions utilized in the present invention is given in Italian patent application 20910 A/86 of the same Applicant, having the title "Aqueous Microemulsions of Perfluoropolyethers", and in the copending U.S. application having as a title "Microemulsions Containing Perfluoropolyethers" inventors Mario Visca and Alba Chittofrati, and the same assignee and filed concurrently with the present application.

The microemulsion preparationis reproduceable is not influenced by volume effects and provides a system, in which the interphase area is very high: that permits to transfer polymerization recipes from a laboratory scale to a commercial scale without problems, and to sensibly reduce—the polymerization kinetics being the same—the perfluoropolyether amount which is present in the polymerization medium.

It is of importance that perfluoropolyether should be in the form of a microemulsions at the moment of its addition to the polymerization medium, while it must not necessarily be in this form once it is diluted in the solution in the autoclave.

Any perfluoropolyether composed of sequences of perfluorooxyalkylene units can be advantageously utilized.

The mean molecular weights of the perfluoropolyethers can vary over a wide range starting from a value of about 500.

In the process of the invention, however, it is preferable to use perfluoropolyethers with a molecular weight ranging from 600 to 3000.

Suitable perfluoropolyethers are, for example, the ones of the following classes:

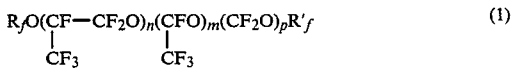  (1)

with a random distribution of the perfluoro-oxyalkylene units, where $R_f$ and $R'_f$ like or different from each other, are —$CF_3$, —$C_2F_5$, —$C_3F_7$, and m, n, p have such values as to meet the abovesaid conditions regarding the mean molecular weight;

(2) 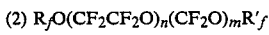

with a random distribution of the perfluoro-oxyalkylene units, where $R_f$ and $R'_f$, like or different from each other, are —$CF_3$ or —$C_2F_5$, and m and n have such values as to meet the abosaid conditions;

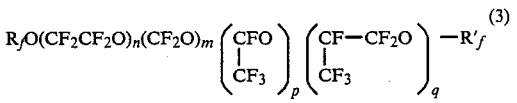  (3)

with a random distribution of the perfluoro-oxyalkylene units, where $R_f$ and $R'_f$, like or different from each other, are —$CF_3$, —$C_2F_5$ or —$C_3F_7$, and m, n, p, q have such values as to meet the abovesaid conditions;

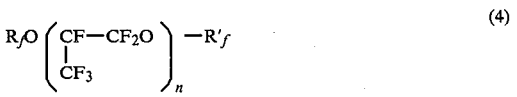  (4)

where $R_f$ or $R'_f$, like or different from each other, are —$C_2F_5$ or —$C_3F_7$, and n has such a value as to meet the abovesaid conditions:

(5) $R_fO(CF_2CF_2O)_nR'_f$ where $R_f$ and $R'_f$, like or different from each other, are —$CF_3$, —$C_2F_5$, and n has such a value as to meet the abovesaid conditions;

(6) $R_fO(CF_2CF_2CF_2O)_nR'_f$ where $R_f$ and $R'_f$, like or different from each other, are —$CF_3$ or —$C_2F_5$ or $C_3F_7$, n having such a value as to meet the abovesaid conditions;

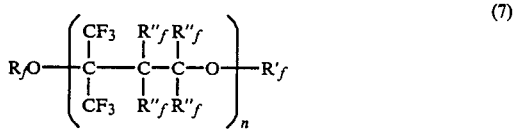

and

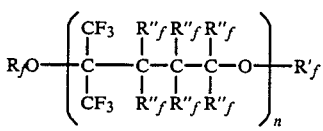

wherein $R_f$ and $R'_f$ are perfluoroalkyl, $R''_f$ are F or perfluoroalkyl, n having a such value as to fulfill the abovesaid conditions.

Perfluoropolyethers of class (1) are commercially known under the trademark Fomblin®Y or Galden®; the ones of class (2), under the trademark Fomblin®Z, all of them being manufactured by Montedison.

Commercially known products of class (4) are Krytox® (Du Pont). The products of class (5) are described in U.S. Pat. No. 4,523,039 or in J. Am. Chem. Soc. 1985, 107, 1197–1201. The products of class (6) are described in European patent EP 148,482 in the name of Daikin.

The products of class (3) are prepared according to U.S. Pat. No. 3,655,041.

The products of class (7) are described in PCT patent application WO. 87/00538.

The amount of perfluoropolyether to be used in the process of the invention is very low. The amount is of the order of 0.05-2 ml per liter of polymerization aqueous solution. The preferred amounts are 0.4-1.5 ml per liter.

As a radicalic starter it is possible to use any type which is well known for the polymerization in aqueous dispersion of fluorinated monomers.

Peroxidized compounds in general, either inorganic or organic, are suitable: among the former, potassium or ammonium persulphates are particularly suitable. As organic peroxidesl, there are suitable both those which are water-soluble, such as disuccinyl peroxide, and those which are water-insoluble (see for example EP 75,312). It is possible to use also the known radicalic starters of the type of the azo-compounds, such as e.g. the ones described in US P 2,515,628 and 2,520,338. When it is desirable to operate at low polymerization temperatures (for example from 10° to 50° C.), a Redox starter can be used.

The radicalic starter amount is the one which is usually employed in the polymerization of fluoro-olefins: it ranges from 0.003% to 2% by weight referred to the total amount of polymerizated monomers.

The radicalic starter or—according to the case—the Redox system components, can all be introduced into the reactor at the beginning of polymerization, or they can be gradually added in the course of polymerization.

The surfactant required to stabilize the latex particles is contained in part or in whole in the neutral perfluoropolyether microemulsion. Generally, the surfactant contained in the microemulsion is sufficient for the polymerization process.

Suitable surfactants are the known ones, which consist of perfluorinated compounds, in particular those having: 6 to 11 carbon atoms, of the class of carboxylic and sulphonic acids.

Further suitable surfactants are those of the class of the perfluoropolyethers having one to two acid end groups.

The latter class of surfactants is the preferred, as it offers the advantage of a better solubilizing effect towards the perfluoropolyether having neutral end groups.

The perfluoropolyether microemulsion must be introduced into the aqueous phase at the beginning of polymerization: no assumption are made on the perfluoropolyether dispersion degree, after the microemulsion has been diluted in the polymerization medium: it could be still in the form of a microemulsion, or in a less finely particled state. Probably, however, the perfluoropolyether dispersion degree is remarkably higher than the one attainable by the process according to Italian patent application No. 20256 A/86 of the same Applicant hereof. Subsequently, the other ingredients (monomers, starters, molecular weight regulators, if any) are introduced.

The process for the polymerization in aqueous dispersion according to the present invention can be advantageously utilized also in the preparation of copolymers of $C_2F_4$ of the following classes:

polytetrafluoroethylene of "modified" type, i.e. containing little amounts, lower than 0.5% by weight, of one more comonomers such as for example: perfluoropropene, perfluoroalkyl-perfluorovinylethers, vinylidene fluoride, hexwfluoroisobutene, chlorotrifluoroethylene;

thermoplastic copolymers of $C_2F_4$ comprising the copolymers containing from 7 to 27% by weight of $C_3F_6$ (type FEP produced by Du Pont), the ones containing from 0.5 to 10%, in particular from 2 to 4% by weight of perfluorialkylperfluorovinylethers (type PFA), the ones containing a high amount of $C_2H_4$ plus a little amount of a third comonomer of the fluorinated type (such as Tefzel® produced by Du Pont).

elastomeric copolymers containing from 20% to 50% by mols of perfluoroalkylperfluorovinylether (or of perfluoro-oxyalkyl-perfluorovinyl ether) and a cure site monomer (for example Kalrez® produced by Du Pont);

elastomeric terpolymers of classes $CF_2=CH_2/C_2F_4/C_3F_6$ and $CF_2=CH_2/C_2F_4/PFVE$.

As a further case in which the polymerization process of the invention can be usefully employed we can cite the thermoplastic copolymer $ClFC=CF_2$/ethylene (type Halar).

The process according to the invention offers, besides the advantages described hereinbefore, also the same advantages (possibility to operate at lower polymerization pressures than the one of the art) which are illustrated in Applicant's Italian application No. 20256 A/86 relating to the copolymerization of fluorinated monomers; a particular feature of the process forming the object of the present invention is the obtainment of fluoropolymer aqueous dispersions characterized by an extremely high number of particles per liter and by an extremely little diameter of the particles. Typical examples of values of number of polymer particles per liter are of the order of $0.5$–$5.10^{18}$.

A further characteristic of the process forming the object of the present invention is that—with equal polymerization kinetics—the utilized perfluoropolyether amount is lower by about an order of magnitude than the one indicated in the examples of Italian patent application No. 20256 A/86 filed by the Applicant, and this leads to the above mentioned advantages.

The examples given hereinafter are merely illustrative of a few practical embodiments of the process according to the invention.

The following methods of analysis and characterization have been utilized to determine the properties of the polymeric materials obtained in the examples.

(a) The determination of the melting start temperature, of the melting peak temperature and of the melting end temperature was carried out by differential calorimetry, using a Perkin-Elmer calorimeter, type DSC IV. About 10 mg of copolymer were heated from room temperature up to 350° C. at a heating rate of 10° C./minute.

The polymer was cooled to room temperature at a rate of 10° C./minute and heated again to 350° C. at the same heating rate. The temperature corresponding to the maximum of the melt endotherm is hereinafter indicated as second melt peak.

(b) The HPF content in the $C_2F_4/C_3F_6$ copolymer was determined by FTIR spectroscopy using a Nicolet spectroscope mod. 20SXB on a thin film (0.05 mm–0.01 mm) formed by extrusion at 340° C. The ratio between the absorbance of the band characteristics of HFP at 983 $cm^{-1}$ and the absorbance of the reference band at 2353 $cm^{-1}$ is hereinafter indicated as absorbance specific ratio. The weight percent content of HFP is calculated through proper calibration obtained from differential mass balance, by multiplying the adsorbance specific ratio by 4.5.

(c) For determining the viscosity of the melt or the melt flow index (MFI) use was made of the apparatus described in standard ASTM D-1238-65T, with the exception that the cylinder, the piston and the outlet nozzlewere manufactured from corrosion-proof material. The outlet nozzle had a length of 8 mm and its inside diameter was of 2.0955 mm. The diameter of the cylinder was 0.95 cm. A certain amount of polymer was molten in the cylinder and was maintained at 372° C. for about ten minutes. The molten polymer was then extruded through a nozzle, maintaining a constant extrusion pressure of 5 kg on the piston. The MFI value was calculated on the basis of the grams of polymer extruded through the nozzle in 10 minutes. To obtain the melt apparent viscosity expressed in poises it is sufficient to divide 53,500 by MFI value.

(d) The volatility index (V.I.) was determined by weighing 10 g of resin on an aluminium sheet, which was placed into a glass vial connected with a vacuum system. Vacuum (2 mm Hg) was generated in the vial and, once the equilibrium was attained, the vial was heated to 380° C. The pressure in the vial was recorded with respect to the time. The volatility index was calculated by the following formula:

$$V.I. \frac{(P_{40} - P_o)V}{10}$$

where $P_o$ and $P_{40}$ are the pressure, expressed in mm of Hg, in the vial at time 0 and after 40 minutes, respectively, and V is the vial volume of $121 \pm 0.2$ $cm^3$.

(e) The mean diameter of the particles was measured by means of a Coulter nano sizer by laser light diffusion. A latex sample was diluted from 1 to 100 and filtered on a Millipore 1.0-micron filter. Six measurements were then carried out, the maximum value and the minimum value were discarded and the arithmetical means of the values so found was assumed as mean diameter value of the particles. The data were in good accordance with the ones found by transmission electron microscopy, which is another method utilizable to determine the mean diameter of the particles.

(f) The polymer resin was extruded in a Brabender extruder, type Plasticord PL 651, to cylindrical pellets having a diameter of about 3.5 mm and a thickness from 1.5 to 3 mm. The color of the granules was determined by projecting white light through the sample, by causing the reflected light to pass through a set of filters and by measuring, at last, the intensity of the light. A high percentage of reflected green light indicates a high whiteness. Utilized was a Gardner colorimeter, type XL 10A.

EXAMPLE 1

Into a glass vessel there were introduced 5 parts of an acid having the structure of a perfluoropolyether belonging to class 1, wherein $R'_f$=—$CF_2COOH$ or —COOH, having a acidmetric molecular weight of 632, 3 parts of a perfluoropolyether of class .1 with perfluoroalkyl and groups and PM 800, 5 parts of an aqueous solution of 10% $NH_4OH$ and 10 parts of water.

The resulting dispersion was heated to 75° C. under slight stirring. A prefectly limpid solution was obtained. By cooling to room temperature, the solution separated into two phases, but the system behaved reversely to heating. The system was identified as a microemulsion stable in the range of 60°–90° C. 15.3 ml of the microemulsion at 75° C., which contained 2 ml of the above-indicated neutral perfluoropolyether, were added to 2 l of carefully deaerated water in a 4.2 l autoclave made of steel AISI 316, equipped with a mechanical stirrer, in which vacuum had been previously generated.

The temperature in the autoclave was brought to 95° C. under mechanical stirring (600 rpm). The pressure was brought to 20 kg/$cm^2$ g. using a gaseous mixture containing 63% by moles of $C_3F_6$ and 37% of $C_2F_4$. 62 ml of an aqueous solution prepared by dissolving 0.73 g of $(NH_4)_2S_2O_8$ and 0.73 g of $K_2S_2O_9$ in 500 ml of $H_2O$ were then introduced into the autoclave. As soon as the pressure in the autoclave began to decrease, it was restored by feeding, by means of a compressor, a $C_3F_6/C_2F_4$ mixture containing 5.8% by moles of hexafluoropropene. After 15 minutes, the abovesaid persulphate solution was fed at a flowrate of 88 ml/h. Stirring in the reactor was continued for 60 minutes, whereafter the reaction was stopped and the gas mixture was discharged. An aqueous dispersion containing 224 g/l of a polymeric resin was obtained.

The mean diameter of the dispersion particles, determined through electron microscopy, was equal to 0.041 μm. The number of particles per liter of water ($N_{p/l}$) was equal to $2.9 \cdot 10^{18}$.

The aqueous dispersion was coagulated by mechanical stirring, was filtered and the solid product was repeatedly washed with distilled water and dried in a fan cooled oven at 200° C. The product had a M.F.I. (melt flow index) of 0.65 g/10 minutes and a second melt peak at 262.4° C. The resulting powder was extruded in a Brebender single-screw extruder. Regular and perfectly white pellets were obtained. The product did not need any further stabilization and whitening treatment. The thermovolatility index was of 59 and the whiteness of 71.

EXAMPLE 2

It was operated as in example 1 using 11 ml of the micro emulsion according to example 1, containing 1.43 ml of neutral perfluoropolyether.

The reaction was stopped after 65 minutes and the latex was discharged. An aqueous dispersion containing 225 g/l of a polymeric resin was obtained. The average diameter of the particles was determined by electron microscopy and resulted to be equal to 0.046 μm, corresponding to a number of particles per liter of water of $2.2 \cdot 10^{18}$.

The coagulated powder exhibited a melt flow index of 0.92 and an absorbance specific ratio of 3.5.

EXAMPLE 3 (comparison test)

8 ml of the perfluoropolyether of example 1 with perfluoroalkyl end groups were added to 250 ml of distilled water. The suspension was stirred for 5 minutes by means of an Ultraturrax ® stirrer mod. T65 (10,000 rpm) manufactured by IKA Werke. There was added an aqueous solution containing 4 g of

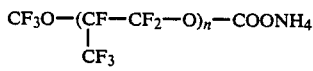

having an equivalent acidimetric molecular weight of 690. The emulsion so obtained was homogenized for further 5 minutes. The dispersion was charged into a steel AISI 316 autoclave of 4.2 liter volume, wherein vacuum had been previously generated. Distilled water was added up to a total volume of 2,000 ml. The temperature in the autoclave was brought to 95° C.; the pressure was brought to 20 kg/cm$^2$ gauge using a gaseous mixture containing 62% by moles of $C_3F_6$ and 38% by moles of $C_2F_4$. 62 ml of an aqueous solution obtained by dissolving 0.73 g of $(NH_4)_2S_2O_8$ and 0.73 g of $H_2S_2O_8$ in 500 ml of $H_2O$ were then introduced into the autoclave. As soon as the pressure in the autoclave began to decrease, it was brought to the initial value by feeding, through a compressor, a $C_3F_6/C_2F_4$ mixture containing 6.7% by moles of hexafluoropropene. After 15 minutes, the above-mentioned persulphate solution was fed at a rate of 88 ml/h. Stirring in the reactor was conducted for 65 minutes, whereafter it was stopped and the reactor content was discharged.

An aqueous dispersion containing 230 g/l of the polymeric resin was obtained.

The aqueous dispersion was coagulated by mechanical stirring and was filtered; the solid product was repeatedly washed with distilled water and was dried in air circulating oven at 200° C. The product had a melt specific viscosity of $1.063 \times 10^6$ poise and a melt flow index (M.F.I.) of 0.5 g/10 minutes and exhibited a second melting peak at 264.9° C. The resulting powder was extruded in a Brabender single-screw extruder: regular and perfectly white pellets were obtained. The product did not require any further stabilizing and whitening treatment. The thermovolatility index was of 60 and the whiteness of 71.

EXAMPLE 4

4.7 ml of a carboxylic acid having the structure of a perfluoropolyether belonging to class 1) and having a mean molecular weight of 632 were neutralized with 5 ml of 10% $NH_3$. 10 ml of $H_2O$ and 3 ml of perfluoropolyether oil of example 1 having per fluoroalkyl end groups were added.

By heating to a temperature of 70° C., a limpid and stable single-phase system was obtained, which resulted to be a microemulsion of the perfluoropolyether.

The microemulsion so prepared was added, at a temperature of 75° C., to 3 l of thoroughly deaerated water, contained in an AISI 316 steel autoclave of 4.2 l volume, equipped with a mechanical stirrer, in which vacuum had been previously generated.

The temperature in the autoclave was brought to 95° C. under mechanical stirring (600 rpm). The autoclave was pressurized to 20 kg/cm$^2$ gauge with a gas mixture containing 11.57% by moles of perfluoromethylvinylether $C_3F_6O$ and 88.43% of $C_2F_4$.

124 ml of a solution containing 0.362 g/l of $K_2S_2O_8$ and 0.362 g/l of $(NH_4)_2S_2O_8$ were then introduced into the auto clave.

As soon as the pressure in the autoclave began to sink, it was restored by feeding, through a compressor, a $C_3F_6O/C_2F_4$ mixture containing 2.71% by moles of $C_3F_6O$. After 15 minutes, the above-specified persulphate solution was fed at a rate of 88 ml/hour.

After stirring for 60 minutes, the reaction was interrupted and the gas mixture was discharged.

An aqueous dispersion containing 214 g/l of polymer was obtained.

The average $C_3F_6O$ content in the polymer, determined by mass balance, was of 3.1% by moles.

EXAMPLE 5

It was operated as is described in example 1, using 10 ml of the microemulsion described therein, containing 1.3 ml of neutral perfluoropolyether.

The autoclave was brought to 30° C., whereafter 100 mg of $(NH_4)_2S_2O_8$ were introduced and the pressure was brought to 20 atm. by means of a mixture of TFE and perfluoromethylvinylether (PFMVE) (1.6% by moles of PFMVE comonomer).

As aqueous solution containing 30 mg of Mohr salt was then introduced into the autoclave. As soon as the pressure in the autoclave began to decrease, it was restored by means of $C_2F_4$. The reaction temperature was gradually raised during the reaction up to 60° C. After 75 minutes, stirring was stopped and the gas mixture was discharged, thereby obtaining an aqueous dispersion containing 200 g/l of polymer. The average diameter of the dispersion particles, determined by electron microscopy, resulted to be of 0.070 microns.

The number of particles per liter of water ($N_{p/l}$) was equal to $5.2 \times 10^{17}$.

The comonomer content (PFMVE) of the coagulated polymer, determined by mass balance and FTIR sprectroscopy, resulted to be of 0.62% by weight.

What we claim is:

1. A process for polymerizing and copolymerizing fluorinated monomers, in an aqueous dispersion, by using radicalic starters and fluorinated surfactants, characterized in that it is operated in the presence of perfluoropolyethers having neutral end groups prepared in the form of an aqueous microemulsion, said perfluoropolyethers being liquid under the polymerization conditions.

2. The process for polymerizing and copolymerizing fluorinated monomers, in an aqueous dispersion, according to claim 1, wherein the perfluoropolyether has a mean molecular weight not lower than 500, the perfluoropolyether amount being not lower than 0.05 ml per liter of polymerization aqueous solution.

3. The process according to claim 2, wherein the perfluoropolyether is selected from the following classes:

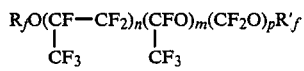  (1)

with a random distribution of the perfluorooxyalkylene units, where $R_f$ and $R'_f$, equal or different from each other, are —$CF_3$, —$C_2F_5$, —$C_3F_7$, and m, n, p have such values as to fulfil the abovesaid mean molecular weight conditions.

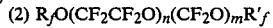  (2)

with a random distribution of the perfluorooxyalkylene units, where $R_f$ and $R'_f$, equal or different from each other, are —$CF_3$ or —$C_2F_5$, and m and n have such values as to fulfil the abovesaid conditions;

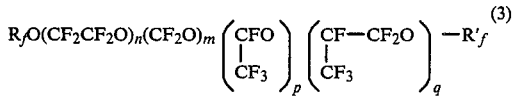  (3)

with a random distribution of perfluorooxyalkylene units, where $R_f$ and $R'_f$, equal or different from each other, are —$CF_3$, —$C_2F_5$ or —$C_3F_7$, and m, n, p, q have such values as to fulfil the abovesaid conditions;

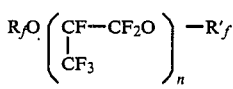  (4)

where $R_f$ and $R'_f$, equal or different from each other, are —$C_2F_5$ or —$C_3F_7$, and n has such a value as to fulfil the abovesaid conditions;

  (5)

where $R_f$ and R'HD f, equal or different from each other, are —$CF_3$, —$C_2F_5$, and n has such a value as to fulfil the abovesaid conditions;

  (6)

where $R_f$ and $R'_f$, equal or different from each other, are —$CF_3$ or —$C_2F_5$ or —$C_3F_7$, n having such a value as to fulfil the abovesaid conditions.

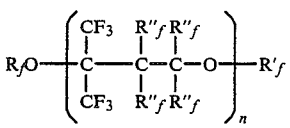  (7)

and

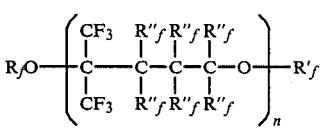

wherein $R_f$ and $R'_f$ are perfluoroalkyl, $R''_f$ are F or perfluoroalkyl, n having a such a value as to fulfil the abovesaid conditions.

4. The process according to claim 1 wherein the surfactant belongs to the class of the perfluoropolyethers having an acid end group.

5. The process according to claim 1, wherein $C_2F_4$ is copolymerized with $C_3F_6$ in such a ratio as to obtain a copolymer containing from 7% to 27% by weight of $C_3F_6$.

6. The process according to claim 1, wherein $C_2F_4$ is copolymerized with a perfluoroalkylperfluorovinylether in such a ratio as to obtain a copolymer containing less than 0.5% by weight of perfluoroalkylperfluorovinylether.

7. The process according to claim 1, wherein $C_2F_4$ is copolymerized with a perfluoroalkylperfluorovinylether in such a ratio as to obtain a copolymer containing from 0.5 to 10% by weight of perfluoroalkylperfluorovinylether.

8. Polymers and copolymers prepared from fluorinated monomers according to the polymerization process claimed in claim 1.

* * * * *